United States Patent
David et al.

(10) Patent No.: US 7,533,901 B2
(45) Date of Patent: May 19, 2009

(54) CHILD SAFETY SEAT SET-UP IN A VEHICLE

(76) Inventors: Yair David, 6 Ankor, Ramat Hasharon (IL) 47229; Arnon David, 6 Ankor, Ramat Hasharon (IL) 47229; Doron David, D.N. Hof Ashkelon 223, Gea (IL) 79110

( * ) Notice: Subject to any disclaimer, the term of this patent is extended or adjusted under 35 U.S.C. 154(b) by 151 days.

(21) Appl. No.: 11/560,864

(22) Filed: Nov. 17, 2006

(65) Prior Publication Data
US 2007/0075580 A1    Apr. 5, 2007

Related U.S. Application Data

(63) Continuation-in-part of application No. PCT/IL2005/001174, filed on Nov. 10, 2005.

(60) Provisional application No. 60/685,398, filed on May 31, 2005.

(51) Int. Cl.
*B60R 22/30* (2006.01)
(52) U.S. Cl. .................... 280/801.1; 297/468
(58) Field of Classification Search .......... 280/801.1, 280/808; 297/250.1, 468, 483, 485; 24/579.11
See application file for complete search history.

(56) References Cited

U.S. PATENT DOCUMENTS

| | | |
|---|---|---|
| 4,291,915 A | 9/1981 | Cox |
| 4,645,231 A | 2/1987 | Takada |
| 4,966,393 A | 10/1990 | Tokugawa |
| 5,121,527 A | 6/1992 | Righi |
| 5,248,187 A | 9/1993 | Harrison |
| D352,591 S | 11/1994 | Lancy |
| 5,381,590 A | 1/1995 | Liou et al. |
| 5,507,558 A | 4/1996 | Kain |
| 5,570,933 A * | 11/1996 | Rouhana et al. ............. 297/483 |
| 5,596,312 A * | 1/1997 | Fowler et al. ............ 340/457.1 |
| D393,337 S | 4/1998 | Seki |
| 5,788,282 A | 8/1998 | Lewis |
| 5,795,030 A | 8/1998 | Becker |
| 6,343,841 B1 | 2/2002 | Gregg et al. |
| 6,481,750 B1 * | 11/2002 | Kalina et al. ............. 280/801.1 |
| 6,520,392 B2 | 2/2003 | Thibodeau et al. |
| 6,969,122 B2 | 11/2005 | Sachs et al. |
| 2006/0267394 A1 * | 11/2006 | David et al. ................. 297/468 |

FOREIGN PATENT DOCUMENTS

DE            4019402 A1 *  12/1991

* cited by examiner

*Primary Examiner*—Faye M. Fleming
*Assistant Examiner*—Laura Freedman
(74) *Attorney, Agent, or Firm*—Pearl Cohen Zedek Latzer, LLP

(57) ABSTRACT

A seatbelt adaptor and a method to be used to improve of the setup of a child safety seat in a vehicle, the seatbelt adaptor comprising a central lengthening device and two connectors disposed at both ends of the central lengthening device. The connectors are suited for the buckles of the vehicle's seatbelts, and wherein the length of the seatbelt adaptor is suited to improve upon the latching of the buckle of the seatbelt that secures a child seated in a safety seat within a vehicle. The geometric shape of the safety seat conforms to the geometric shape of the seatbelt adaptor.

12 Claims, 9 Drawing Sheets

CHILD SAFETY SEAT SET-UP IN A VEHICLE

REFERENCE TO CROSS-RELATED APPLICATION

This application is a Continuation-in-Part of PCT/IL2005/001174 filed Oct. 11, 2005.

This application claims priority benefits from PCT/IL2005/001174 filed Oct. 11, 2005, which claims priority benefits from U.S. patent application Ser. No. 11/162827 filed Sep. 24, 2005, which claims priority benefits from U.S. Provisional Application No. 60/685,398, filed on May 31, 2005, herein incorporated by reference in its entirety.

FIELD AND BACKGROUND OF THE INVENTION

The present invention relates to a device, an article of manufacture, and a method for setting up a child safety seat in a vehicle and, in particular to a device, an article of manufacture, and a method, enabling a quick and efficient way to fasten and release the belt buckles which fix the child safety seat or child sitting in the child booster safety seat to the seat's location on the vehicle seat.

Buckling a child to a vehicle seat with the vehicle's seatbelts does not provide sufficient protection in case of an emergency braking or in an accident, for reasons such as the following:

The seatbelts are not sufficiently snug on a small body and do not comprise a sufficient downwards force.

The shoulder belt could lacerate the child's neck.

Most children are not mature enough to be seated in a seat designated for adults.

Children cannot bend their knees at the end of the seat when their backs are against the backrest of the seat.

In order to overcome these difficulties, the booster seat, which is a seat that raises the child and provides a higher sitting height so the adult lap and shoulder belts fit better, has been available for approximately thirty years.

The standard recommendation is to use booster seats for children of ages 4 to 8, weighing 20 to 40 kg.

An example of the existing standard setting is shown in FIGS. 1a and 1b.

FIG. 1a depicts a child safety seat, of booster type 13, on a vehicle's back seat 11 near the backrest 12 of the back seat. On one side of the safety seat 13 the vehicle's seatbelt 14 is disposed with a latch plate 15 attached to it and on the other side, a buckle 16. Usually, the buckle 16 is disposed in the back seat 11 suitably for the comfort of adult passengers.

FIG. 1b depicts the instance in which a child 17 is properly seated with the seatbelt 14 latched by connecting the latch plate 15 into the buckle 16. This configuration makes the access of the buckles by two adult hands in order to latch them extremely difficult. The latching action becomes even harder when an additional safety seat or a baggage item such as a bag or suitcase is placed besides the buckle 16.

Seatbelt 14 is a continuous strap including an upper segment 14d which crosses the child's chest diagonally, from one shoulder to the waist on the opposite side, through latch plate 15 and over the child's lap as a segment 14b The left side of the illustration shows a magnified illustration of latch plate 15 which is connected to buckle 16 and a small segment of seatbelt 14d. Latch plate 15 has a slot 15a through which seatbelt 14 passes, and is actually the place at which the seatbelt 14 is divided into both segments.

As used herein the specification and in the claims section that follows, the term "the seat belt total equivalent force exertion point" and the like refer to the point at which the total equivalent force is substantially exerted by the vehicle's seatbelt 14 on latch plate 15.

The illustration shows the seat belt's total equivalent force exertion point marked as point 40, which is disposed approximately in the center of the upper part of slot 15a.

When a child is fastened in a safety seat, the possibility to quickly and easily unfasten the seatbelt's buckles is of utmost importance, especially when the child needs to be removed from the vehicle as quickly as possible. The duration of the belt buckles' release action in the existing situation may be critical in an emergency because of the limited access to the belt buckles.

FIG. 1c depicts an option of the prior art in which rigid parts, such as latch plate 15 and buckle 16, of a child restraint system are in contact with a booster safety seat 13. This contact, when a tension force is exerted on the restraint system, could exert forces in unwanted directions on the booster safety seat 13. In addition, this contact, especially when the structure of the booster safety seat 13 in the area of contact is a rigid structure, could cause the child seated in the booster safety seat 13 discomfort as a result of friction and being hit by the rigid parts of the restraint system.

There is therefore a need to improve the setup of a child safety seat in a vehicle and to ensure the possibility of speedy release of the seatbelts strapping the child into the safety seat.

SUMMARY OF THE INVENTION

It is an objective of the present invention to provide a device, an article of manufacture, and a method to improve the setup of a child safety seat in a vehicle.

According to the present invention there is provided a seatbelt adaptor to be used to improve the buckling and unbuckling of a child in a child booster safety seat in a vehicle, for use in conjunction with a conventional seatbelt restraint system, wherein the child's thigh depth dimension while seated is at least six centimeters, and wherein the child's abdominal depth dimension while seated is at least twelve centimeters, the seatbelt adaptor including: (a) a central lengthening device; (b) a latch plate for reversible attachment and detachment to a buckle of the conventional seatbelt restraint system, the latch plate disposed at a first end of the central lengthening device; and (c) a buckle for reversible attachment and detachment to a latch plate of the conventional seatbelt restraint system, the buckle disposed at a second end of the central lengthening device, wherein the latch plate of the seatbelt adaptor is configured for reversibly connecting to the buckle of the conventional seatbelt restraint system, and wherein the buckle of the seatbelt adaptor is configured for reversibly connecting to the latch plate of the conventional seatbelt restraint system, that secures a child into the child booster safety seat within the vehicle, and wherein the length of the seatbelt adaptor has dimensions suitable for improving the latching of the buckles of the vehicle's conventional seatbelt restraint system, wherein the buckle of the seatbelt adaptor has a conventional seatbelt restraint system buckle structure, that enables the detachment of the buckle of the seatbelt adaptor from the latch plate of the conventional seatbelt restraint system, by the single press of a finger, and wherein the buckle of the seatbelt adaptor includes no permanent bolt coupling.

According to further features in preferred embodiments of the invention the central lengthening device is a rigid device.

According to further features in preferred embodiments of the invention the central lengthening device is a safety belt.

According to further features in preferred embodiments of the invention the central lengthening device is an elastic device.

According to further features in preferred embodiments of the invention the seatbelt adaptor further including: (d) a device that prevents children from releasing the buckle; wherein the device that prevents children from releasing the buckle is disposed in the seatbelt adaptor.

According to the present invention there is provided a method for enabling a user to improve buckling and unbuckling of a child in a child booster safety seat in a vehicle, for use in conjunction with a conventional seatbelt restraint system, wherein the conventional seatbelt restraint system has a safety seatbelt, a latch plate and a buckle, wherein the latch plate of the conventional seatbelt restraint system has a slot through which the safety seatbelt of the conventional seatbelt restraint system passes, and wherein the latch plate of the conventional seatbelt restraint system operatively divides the safety seatbelt into two segments, a lap segment and a chest and shoulder segment, and wherein the buckle of the conventional seatbelt restraint system is located close to the motor vehicle's back seat near the backrest of the back seat, and wherein the latch plate of the conventional seatbelt restraint system can be comfortably connected and released, wherein the child's thigh depth dimension while seated is at least six centimeters, and wherein the child's abdominal depth dimension while seated is at least twelve centimeters, the method including the steps of: (a) providing the user with a seatbelt adaptor, the seatbelt adaptor including: (i) a central lengthening device; (ii) a latch plate for reversible attachment and detachment to a buckle of the conventional seatbelt restraint system, the latch plate disposed at a first end of the central lengthening device; and (iii) a buckle for reversible attachment and detachment to a latch plate of the conventional seatbelt restraint system, the buckle disposed at a second end of the central lengthening device, wherein the latch plate of the seatbelt adaptor is configured for reversibly connecting to the buckle of the conventional seatbelt restraint system, and wherein the buckle of the seatbelt adaptor is configured for reversibly connecting to the latch plate of the conventional seatbelt restraint system, that secures the child into the child booster safety seat within the vehicle, and wherein the length of the seatbelt adaptor is so dimensioned as to be suited to improve the latching of the buckles of the vehicle's conventional seatbelt restraint system, wherein the buckle of the seatbelt adaptor has a conventional seatbelt restraint system buckle structure, that enables the detachment of the buckle of the seatbelt adaptor from the latch plate of the conventional seatbelt restraint system, by the single press of a finger, and wherein the buckle of the seatbelt adaptor includes no permanent bolt coupling; (b) connecting the latch plate of the seatbelt adaptor to a vehicle's buckle located near the vehicle's seat; and then (c) seating the child in the safety seat; and then (d) connecting the latch plate of the vehicle's seatbelt to the buckle of the seatbelt adaptor, wherein the vehicle's seatbelt is to be fastened on the child's body.

According to further features in preferred embodiments of the invention the connecting of the latch plate of the vehicle's seatbelt to the buckle of the seatbelt adaptor is done when there is baggage on the vehicle's seat, making it difficult to connect a latch plate to the vehicle's buckle located near the vehicle's seat.

According to further features in preferred embodiments of the invention the central lengthening device is a elastic device.

According to further features in preferred embodiments of the invention the central lengthening device is a safety belt.

According to further features in preferred embodiments of the invention the central lengthening device is a safety belt with adjustable length.

According to further features in preferred embodiments of the invention the central lengthening device is a rigid device.

According to the present invention the method further including the step of: (e) testing to determine whether in a case of emergency braking the lap segment of the seatbelt will exert an adducing force having a downward component and a backward component relative to the vehicle, so as to adduct the child's lap downwards and backwards with regard to the child booster safety seat.

According to the present invention the method further including the step of: (e) testing to determine whether in a case of emergency break the slot of the latch plate which the seatbelt passes through, is located below the level of the child's waist.

According to the present invention the step of testing, wherein the testing includes pulling the chest and shoulder segment in a direction in front of the child's chest diagonally, toward the shoulder of the child.

According to the present invention the method further including the step of: (e) disconnecting the vehicle's seatbelt latch plate from the buckle of the seatbelt adaptor.

According to the present invention the improvement of the releasing of a child from a child booster safety seat in a vehicle manifests in a shorter required time for disconnecting the vehicle's seatbelt latch plate from the seatbelt adaptor than the required time for disconnecting the seatbelt adaptor from the vehicle's buckle located near the vehicle's seat.

According to the present invention there is provided an article of manufacture for improving the buckling and unbuckling of a child in a child booster safety seat in a motor vehicle, wherein the motor vehicle has a conventional seatbelt restraint system for use of an adult, wherein the conventional seatbelt restraint system has a safety seatbelt, a latch plate and a buckle, wherein the latch plate of the conventional seatbelt restraint system has a slot through which the safety seatbelt of the conventional seatbelt restraint system passes, and wherein the latch plate of the conventional seatbelt restraint system operatively divides the safety seatbelt into two segments, a lap segment and a chest and shoulder segment, and wherein the buckle of the conventional seatbelt restraint system is located close to the motor vehicle's back seat near the backrest of the back seat, and wherein the latch plate of the conventional seatbelt restraint system can be comfortably connected and released, enabling safe restraining of a child in normal operation and in case of emergency, and enabling easy and safe release of the child from the child restraint system, the article of manufacture including: (a) a child booster safety seat, having an upper surface for the child to sit upon; and (b) a seatbelt adaptor, wherein the child, while seated, has a thigh depth dimension of at least six centimeters, and an abdominal depth dimension of at least twelve centimeters, the seatbelt adaptor including: (i) a central lengthening device; (ii) a latch plate for reversible attachment and detachment to the buckle of the conventional seatbelt restraint system, the latch plate disposed at a first end of the central lengthening device; and (iii) a buckle for reversible attachment and detachment to the latch plate of the conventional seatbelt restraint system, the buckle disposed at a second end of the central lengthening device, wherein the latch plate of the seatbelt adaptor is configured for reversibly connecting to the buckle of the conventional seatbelt restraint system, and wherein the buckle of the seatbelt adaptor is configured for reversibly connecting to the latch plate of the conventional seatbelt restraint system, that secures a child into the child booster safety seat within the motor vehicle, and wherein the length of the seatbelt adaptor is so dimensioned as to be suited to improve the latching of the buckles of the motor vehicle's conventional seatbelt restraint system, wherein the buckle of the seatbelt adaptor has a conventional seatbelt restraint system buckle structure, that enables the detachment of the buckle of the seatbelt adaptor from the latch plate of the conventional seatbelt restraint system, by the single press of a finger, and wherein the buckle of the seatbelt adaptor includes no permanent bolt coupling, wherein geometrical characteristics of the child booster safety seat, the seatbelt adaptor, the latch of the conventional seatbelt restraint system, and the buckle of the conventional seatbelt restraint system are combined such that when the latch of the conventional seatbelt restraint system is connected to the buckle of the seatbelt adaptor, and the latch of the seatbelt adaptor is connected to the buckle of the conventional seatbelt restraint system, ensures that when a force is activated on the latch of the conventional seatbelt restraint system upwards with regard to the motor vehicle, the location of the slot of the latch plate of the conventional seatbelt restraint system is substantially at the same height above the back seat of the vehicle, as the height of the upper surface of the child booster safety seat, and wherein the characteristics enable fast and easy release of the child from the child restraint system, and ensure that in case of emergency braking, the lap segment of the seatbelt will exerts an adducting force having a downward component and a backward component, relative to the vehicle, so as to adduct the child's lap downwards and backwards with regard to the child booster safety seat, and the chest and shoulder segment of the seatbelt will exerts a backwards adducting force on a the child's chest.

According to further features in preferred embodiments of the invention, when a force is activated on the latch of the conventional seatbelt restraint system upwards with regard to the motor vehicle, the location of the slot of the latch plate of the conventional seatbelt restraint system is substantially at a height of at least six centimeters and at most eight centimeters above the height of the upper surface of the child booster safety seat.

According to further features in preferred embodiments of the invention, when a force is activated on the latch of the conventional seatbelt restraint system upwards with regard to the motor vehicle, the location of the slot of the latch plate of the conventional seatbelt restraint system is substantially at a height of at least eight centimeters and at most ten centimeters above the height of the upper surface of the child booster safety seat.

According to further features in preferred embodiments of the invention, when a force is activated on the latch of the conventional seatbelt restraint system upwards with regard to the motor vehicle, the location of the slot of the latch plate of the conventional seatbelt restraint system is substantially at a height of at least ten centimeters and at most twelve centimeters above the height of the upper surface of the child booster safety seat.

According to further features in preferred embodiments of the invention the central lengthening device is a rigid device.

According to further features in preferred embodiments of the invention the central lengthening device is a safety belt.

According to further features in preferred embodiments of the invention the central lengthening device is an elastic device.

According to further features in preferred embodiments of the invention the seatbelt adaptor further includes: (iv) a device that prevents children from unfastening the buckle of the seatbelt adaptor, wherein the device that prevents children from unfastening the buckle of the seatbelt adaptor is disposed in the seatbelt adaptor.

According to further features in preferred embodiments of the invention the article of manufacture further including: (c) a seat cushion, having an upper surface, disposed at the child booster safety sea, wherein when a force is activated on the latch of the conventional seatbelt restraint system upwards with regard to the motor vehicle, the location of the slot of the latch plate of the conventional seatbelt restraint system is substantially at a height of at least six centimeters and at most eight centimeters above the height of the upper surface of the cushion.

According to further features in preferred embodiments of the invention the geometric shape of the child booster safety seat conforms to the geometric shape of the seatbelt adaptor.

According to further features in preferred embodiments of the invention the child booster safety seat, having a groove with two levels of depth, deep level and less deep level conforms to the geometric shape of the seatbelt adaptor.

According to further features in preferred embodiments of the invention the child booster safety seat is at least in part of a material suitable for restraining vibrations and blows that could be exerted on it when in contact with the seatbelt adaptor.

BRIEF DESCRIPTION OF THE DRAWINGS

The invention is herein described, by way of example only, with reference to the accompanying drawings, wherein:

FIG. 3b is a schematic illustration of a preferred embodiment of the present invention depicting a front view of the necessary direction of the vertical force exerted by the seat belt during an emergency braking on a child seated in the booster safety seat as depicted in FIG. 3a.

FIG. 4b is a schematic illustration of section a-a of FIG. 4a.

FIG. 4c is a schematic illustration of section b-b of FIG. 4a.

DESCRIPTION OF THE PREFERRED EMBODIMENTS

Figure 1A:
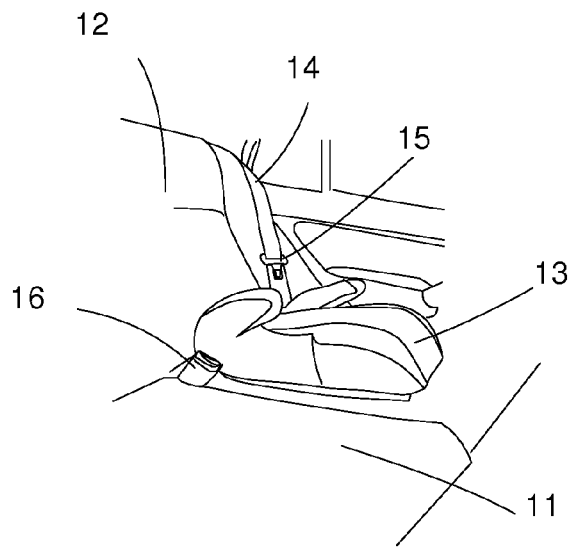
FIG. 1a of the prior art illustrates an empty safety seat placed in the back seat of a medium sized passenger vehicle.

The present invention is a seatbelt adaptor, an article of manufacture and a method to improve the setup of a child safety seat in a vehicle.

The principles and operation of the seatbelt adaptor, and the article of manufacture according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings.

Unless otherwise defined, all technical and scientific terms used herein have the same meaning as commonly understood by one of ordinary skill in the art to which this invention belongs. The materials, methods, and examples provided herein are illustrative only and not intended to be limiting.

Figure 2A:
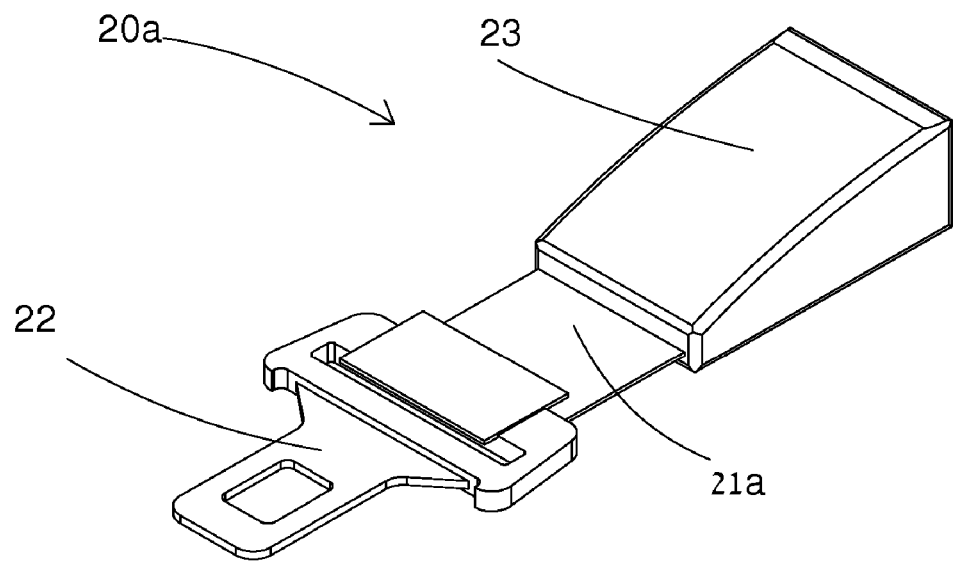
FIG. 2a is a schematic illustration of a preferred embodiment of a seatbelt adaptor with a strap of a fixed length.

Referring now to the drawings, FIG. 2a is a schematic illustration of a preferred embodiment of a seatbelt adaptor 20a with a safety belt of a fixed length 21a. The safety belt 21a lacks any practical resistance to flexion loads and can be identical or similar to the existing seatbelts already installed in the vehicle in which it will be installed as a matter of the material of which it is made and its dimensions, except for its length, which is fitted for its unique purpose. A latch plate 22 is disposed at one end of the safety belt 21a and a buckle 23 is disposed at the other end of the safety belt 21a. Latch plate 22 and buckle 23 are connectors which are compatible with the vehicle's seatbelt buckles and latches. Safety belt 21a constitutes a central lengthening device, which mechanically connects latch plate 22 and buckle 23, and determines the distance between them.

The latch plate 22 and the buckle 23 clearly must be adapted to the latch plate 15 and the buckle 16 installed in the vehicle. The internal mechanism and external form and dimensions of buckle 23 can be identical or similar to those of buckle 16.

The operation of buckle 23 clearly should preferably be identical or similar to the operation of buckle 16, and in any case, its operation must not be more complicated or time consuming, nor less convenient, and should not pose any new limitations.

This applies to all possible embodiments of seatbelt adaptor 20 according to the present invention.

This invention is not limited to the use of a specific safety belt and the latch plate 22 and the buckle 23 may be connected by many means, such as one or more chains, one or more strings, or as depicted later in FIGS. 2b-2d.

This invention is not limited to the type of buckles which enable the connection of the seatbelt adaptor, to the vehicle's seatbelt and vehicle's seatbelt buckles.

The invention also includes the possibility of connecting the seatbelt adaptor directly to the anchoring point of the vehicle's safety belts.

Figure 2B:
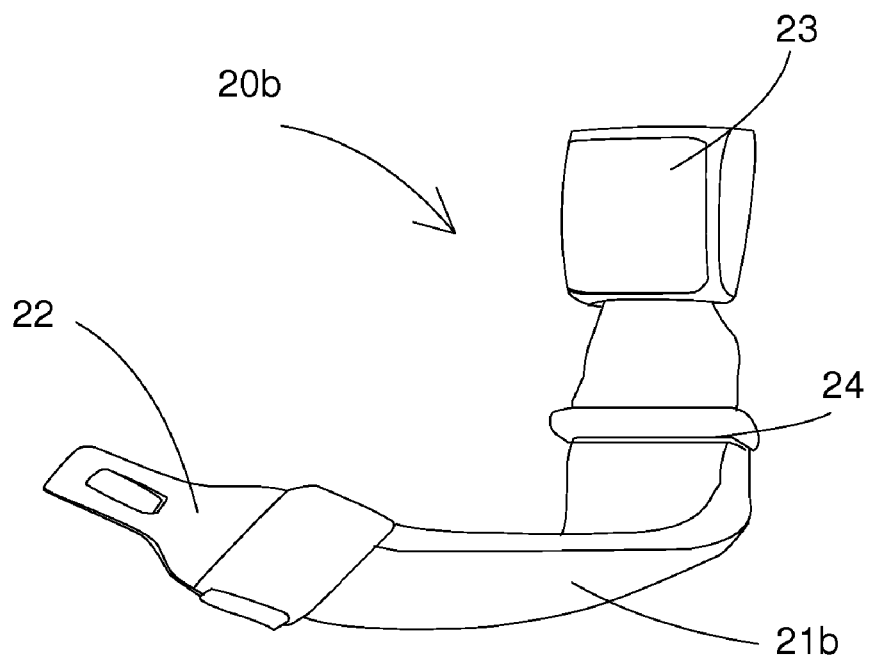
FIG. 2b is a schematic illustration of a preferred embodiment of a seatbelt adaptor with a strap of adjustable length.

FIG. 2b is a schematic illustration of a preferred embodiment of a seatbelt adaptor 20b with a belt of adjustable length. The difference in comparison with seatbelt adaptor 20a is that in seatbelt adaptor 20b has a belt of adjustable length 21b. There are many ways to construct a belt of adjustable length, which anyone skilled in the art is familiar with. The current figure schematically illustrates a ring 24 to which the end of the adjustable length belt 21b is connected through latch plate 22.

Figure 2C:
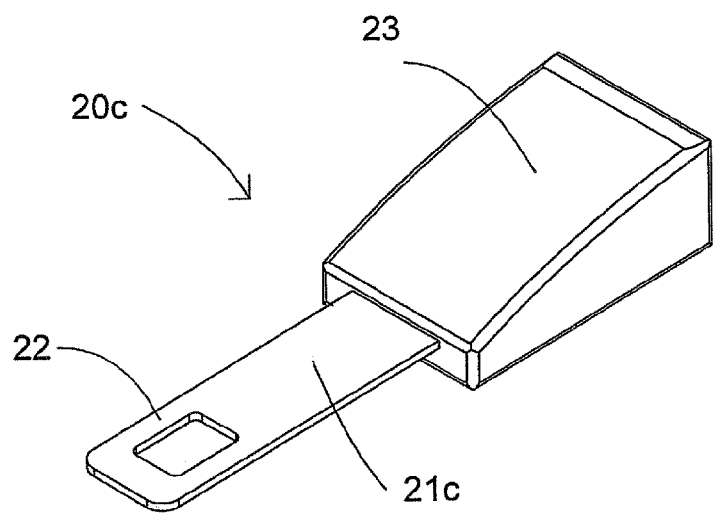
FIG. 2c is a schematic illustration of a preferred embodiment of a seatbelt adaptor made as a rigid unit.

FIG. 2c is a schematic illustration of a preferred embodiment of a seatbelt adaptor 20c made as a rigid device, whose structure, and in particular whose central lengthening device 21c is practically non-bendable by reasonable bending moments which may be induced on it.

Figure 2D:
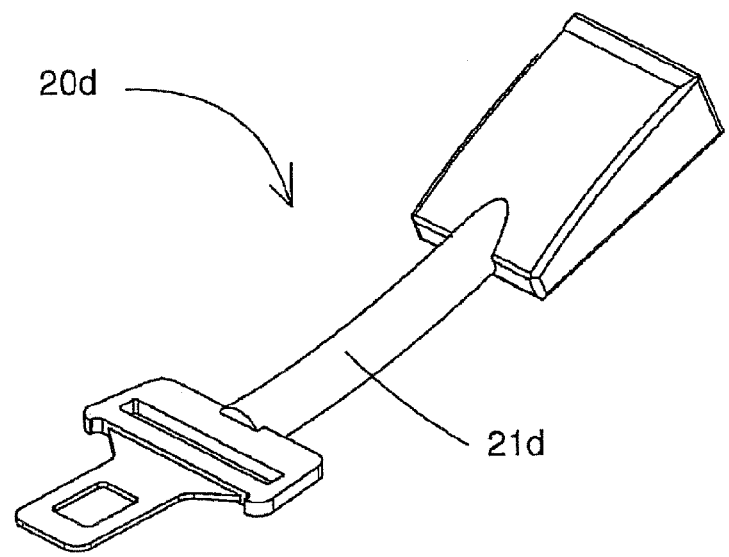
FIG. 2d is a schematic illustration of a preferred embodiment of a seatbelt adaptor made as an elastic unit.

FIG. 2d is a schematic illustration of a preferred embodiment of a seatbelt adaptor 20d made as an elastic device. Its structure and properties are similar to those of seatbelt adaptor 20c except for its central lengthening device 21d, which has elastic properties regarding the reasonable bending moments that may be induced on it.

Figure 2E:
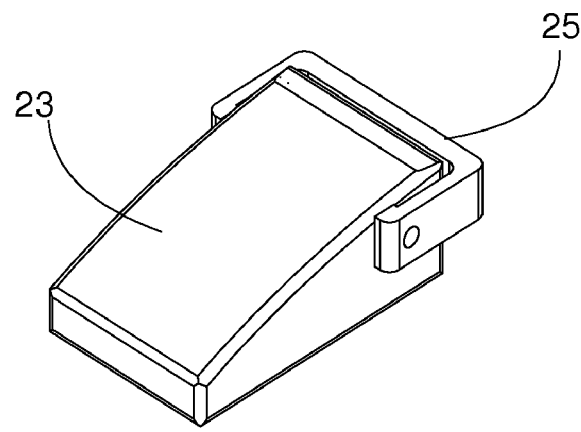
FIG. 2e is a schematic illustration of a preferred embodiment of a seatbelt adaptor with an apparatus preventing the buckle release by a child.

FIG. 2e is a schematic illustration of buckle 23 equipped with a device 25 which prevents the buckle's release by a child.

Figure 2F:
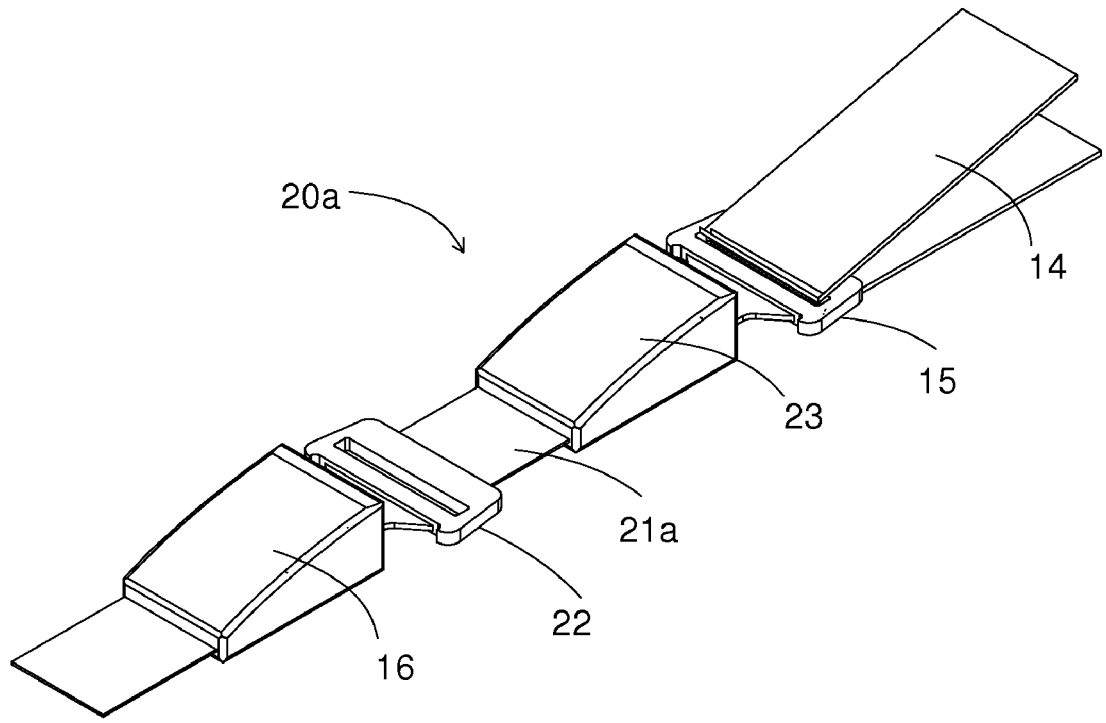
FIG. 2f is a schematic illustration of a preferred embodiment of a seatbelt adaptor attached to the vehicle's seatbelts.

FIG. 2f is a schematic illustration of seatbelt adaptor 20a connected to the vehicle's seatbelts. Latch plate 22 is connected to the buckle 16 and buckle 23 is connected to the latch plate 15 through which the vehicle's seatbelt 14 passes. The vehicle's seatbelt 14 is originally designed to be used on an adult's waist and diagonally from one hip towards the opposite shoulder.

Booster seats are in use because vehicle's seatbelts are not designed for children. Young children are too small for vehicle's seatbelts and too large for infant safety seats.

Millions of parents and caregivers use booster seats as protection for their children who have outgrown their infant safety seats but aren't tall enough for vehicle's seatbelts.

The location in which latch plate 15, through which the vehicle's seatbelt 14 passes, is connected to the vehicle's original buckle 16, and the location according to the present invention of the connection between the latch plate 15, through which the vehicle's seatbelt 14 passes, and the buckle of the seatbelt adaptor with regard to the booster safety seat and the child seated upon it, are of utmost importance.

The requirements that the components of a safety system comprised of a child safety seat, a vehicle's seatbelt, a latch plate, and a buckle, must meet include the following:

Any contact between a component of the system and the child that could harm the child as a result of friction, injury, or any other cause, when in use under normal travel conditions, when buckling and releasing, and in the case of emergency braking or an accident, is prohibited.

When a vehicle slows down abruptly, for example during emergency braking or a collision, the vehicle's seatbelt segment that is in the child's lap must fasten the child to the seat, with combined force exerted downwards and backwards with regard to the vehicle's axes, namely force must be exerted towards the vehicle's seat and towards the backrest of the seat, upon which the seat is placed.

The vehicle's seatbelt must be able to be quickly and easily released in case of an emergency.

The location of the original buckle in a vehicle's seats is based on consideration of the forces exerted downwards and backwards on an adult seated in the seat, in case of need, and therefore the buckle is positioned low and close to the seat and its backrest. As a result, in many cases the requirement of fast release of the buckle, when used in conjunction with a booster child safety seat, is impaired, particularly when an additional child safety seat or other baggage item is also placed on the vehicle seat.

This problem has been known of for years, however no satisfactory solution has been found for it so far. Some parents have just given up on the possibility of connecting the vehicle's seatbelt and reasonably every time they seat their children in a safety seat, and have turned to the highly hazardous practice of fastening the buckles only once and seating and removing their children without unfastening the buckles.

The use of an existent lengthening strap for facilitating fastening and unfastening of the buckles is also hazardous. Many vehicle manufacturers have lengthening straps designed for larger passengers to buckle up in their vehicles. An example of this is Ford's seatbelt extender, which is a piece of seat belt material about 8 inches long with buckles on the ends of it that click into the existing seat belt buckles. Use of a seatbelt lengthening such as this is hazardous as it does not meet the requirement of adducting forces in the right directions.

According to the present invention, the booster safety seat is used in conjunction with a seatbelt adaptor, whose qualities, and particularly whose length, are adapted to meet the safety requirements and also ensure that the location of the connection point of the latch plate 15 through which the vehicle's seatbelt 14 passes will be optimally practical. The optimal location is determined by the length of the seatbelt adaptor, which serves as a compromise between the minimal length which has an advantage with regard to the aforementioned force directions, and the maximal length which has an advantage with regard to the aforementioned convenience of unfastening. The boundaries of this field are from the shortest possible length defined by the size limitations of the components to the longest possible length that in case of emergency braking with exertion of force on the diagonal segment of the vehicle's seatbelt, the tension that is generated due to the high location of latch plate 15 does not generate a downwards adducting force in the vehicle's seatbelt segment resting in the child's lap.

The seatbelt adaptor can be connected to the buckle 16 and can be removed when an adult is seated and buckled up in the seat, or can be connected directly to an anchoring point in the vehicle.

In the case that the seatbelt adaptor is connected to an anchoring point within the vehicle, it can be of a fixed length that is a compromise between buckling up an adult and buckling up a child in a safety seat.

Figure 3A:
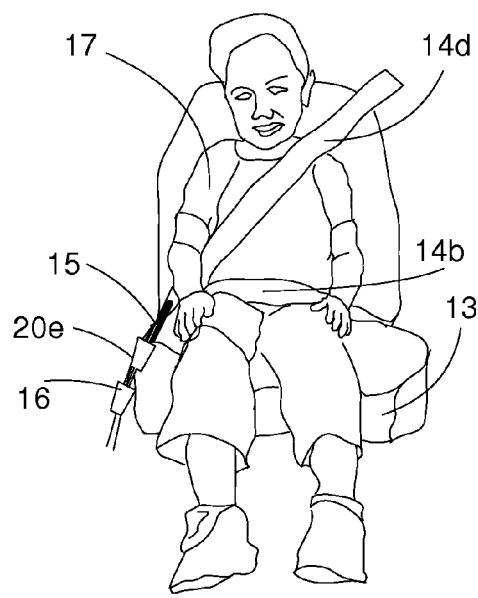
FIG. 3a depicts a front view of a child seated in a booster safety seat, with the seatbelts fastened according to a preferred embodiment of the present invention.

FIG. 3a illustrates the front view of a child seated in a booster safety seat 13, with the vehicle's seatbelt fastened according to a preferred embodiment of the present invention. The child 17 is seated in the booster safety seat 13 and is buckled in a vehicle's seatbelt whose upper segment 14d crosses the child's chest diagonally, from one shoulder to the waist on the opposite side, through latch plate 15 and over the child's lap as a segment 14b of the vehicle's seatbelt. The latch plate 15 connects to seatbelt adaptor 20e which is connected to the buckle 16.

Figure 3B:
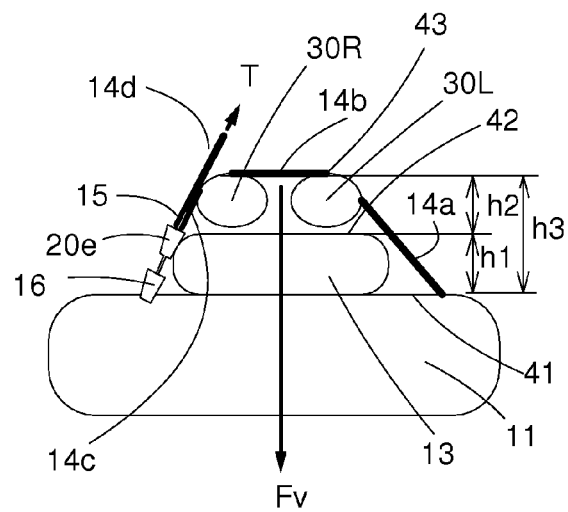

FIG. 3b is a schematic illustration of a preferred embodiment of the present invention depicting a front view of the required direction of the vertical force Fv exerted by the seatbelt on the child seated in the booster safety seat 13, as described in FIG. 3a. The booster safety seat 13, which is placed upon the vehicle seat 11, seats a child whose right leg 30R and left leg 30L are shown in the illustration in section. This illustration shows the vehicle's seatbelt in further detail, with its diagonal segment 14d reaching latch plate 15, inside which it bends back over approximately 180 degrees and returns with the belt segment 14c until bending over the child's right leg 30R, continuing as an approximately horizontal segment until bending back diagonally downwards over the child's left leg 30L as vehicle's seatbelt segment 14a. Latch plate 15 connects to seatbelt adaptor 20e, which is connected to buckle 16. In case of emergency braking, tension T is generated in the vehicle's seatbelt, exerting adducting force Fv downwards relative to the vehicle and adducting the child's lap area downwards to the safety seat. The illustration shows three surfaces, surface 41, which is the upper surface of the vehicle seat 11 upon which the safety seat 13 is placed, surface 42, which is the upper surface of the booster safety seat 13 upon which the child is seated, which can also be the upholstery of said booster safety seat 13 or a cushion, and virtual surface 43 at level with the child's legs 30L and 30R, defining the boundaries for seatbelt segment 14b.

The illustration also shows the gaps between these surfaces, with h1 being the vertical gap between surface 41 and surface 42, h2 being the vertical gap between surface 42 and surface 43; and h3 being the vertical gap between surface 41 and surface 43.

Figure 3C:
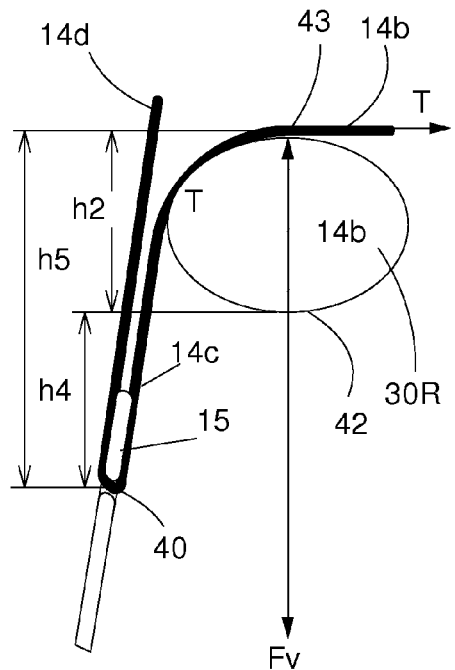
FIG. 3c is a schematic illustration of a preferred embodiment of the present invention depicting a detailed magnification of a part of FIG. 3b.

FIG. 3c is a schematic illustration of a preferred embodiment of the present invention enlarging a part of FIG. 3b.

Point 40 is the point at which the total equivalent force is exerted by the vehicle's seatbelt 14 on latch plate 15.

This illustration shows a section of latch plate 15 with both vehicle seatbelt segments 14c and 14d changing direction at approximately 180 degrees at an axis including point 40. For the tension force T in the vehicle's seatbelt to generate a downwards adducting force Fv in case of need, point 40 must be sufficiently low with regard to the safety seat and the child's leg 30R, otherwise the tension force T will create a distance between the seatbelt segment 14b and the child's legs and enable the child to be separated from the seat, causing severe harm to the child in case of emergency braking and an accident. The illustration also shows the vertical gap h4 between point 40 and surface 42 and vertical gap h5 between point 40 and surface 43.

Figure 3D:
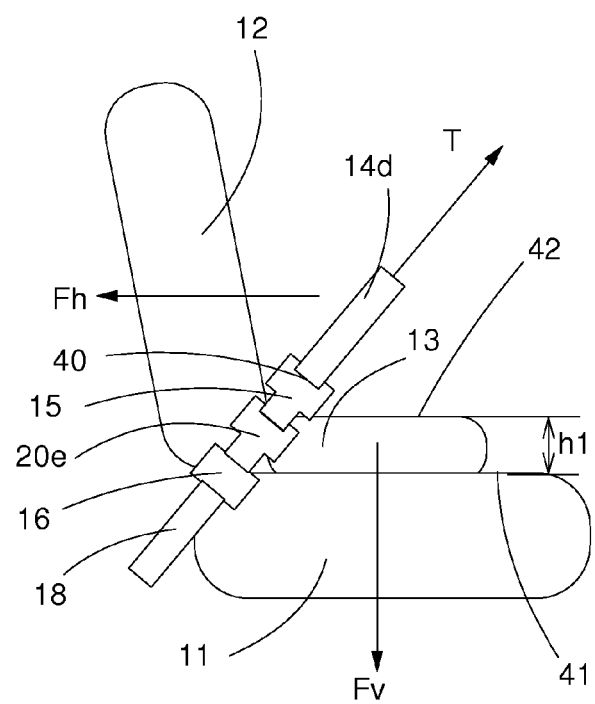
FIG. 3d is a schematic illustration of a preferred embodiment of the present invention depicting a side view of the necessary directions of horizontal and vertical forces exerted by the seatbelt during emergency braking on the child seated in a booster safety seat.

FIG. 3d is a schematic illustration of a preferred embodiment of the present invention showing a side view of the required directions of the vertical and horizontal forces that are exerted by the seatbelt on the child seated in the booster safety seat 13 during an emergency braking. Proper location of point 40, which was explained in the description of FIG. 3c, will ensure the generation of a force with adducting components, downwards component Fv on the vertical plane and backwards component Fh on the horizontal plane with regard to the vehicle's axes, when tension force T is exerted. Proper location of point 40 ensures that gaps h4 and h5 are large enough when point 40 is on a lower plane than that of surface 43 or even on a lower plane than that of surface 42 so that downwards adducting force component Fv is exerted in the case of need. Gap h4 also depends on the geometric qualities of the child booster safety seat, the seatbelt adaptor, the latch of the conventional seatbelt restraint system, and the buckle of the conventional seatbelt restraint system.

Figure 1B:
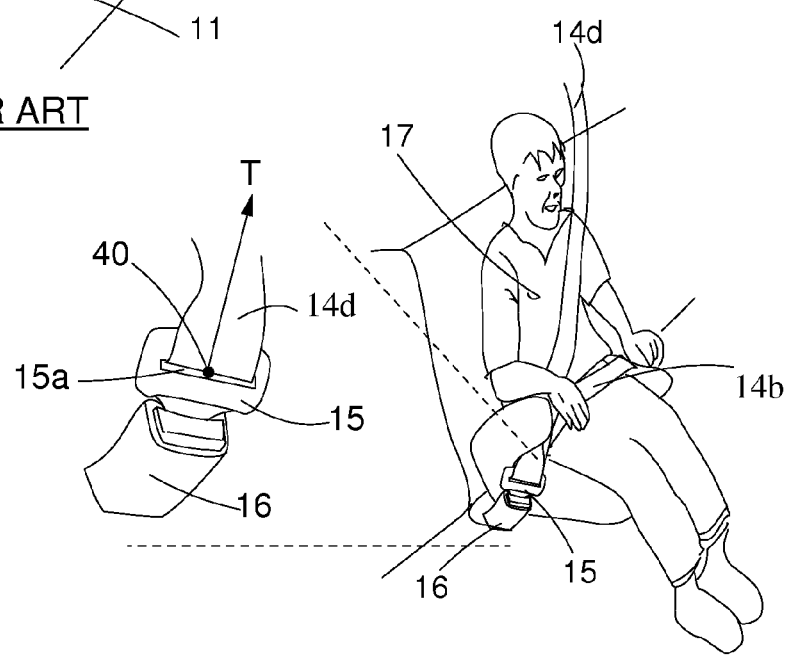
FIG. 1b of the prior art illustrates a child seated in a safety seat, with the seatbelts fastened. The safety seat is installed in the back seat of a medium sized passenger vehicle.
Figure 1C:
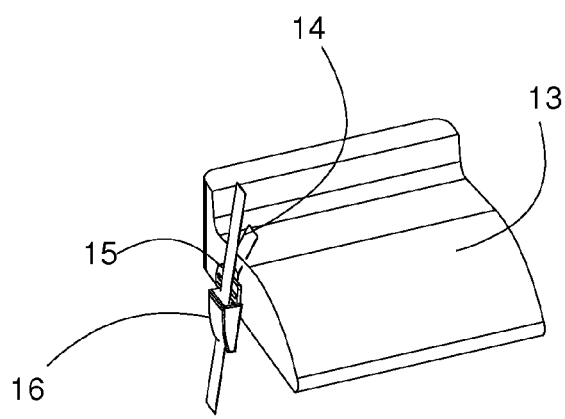
FIG. 1c is a schematic illustration of an option of the prior art, in which rigid parts, such as latch plate 15 and buckle 16, of a child restraint system are in contact with a booster safety seat 13.
Figure 3E:
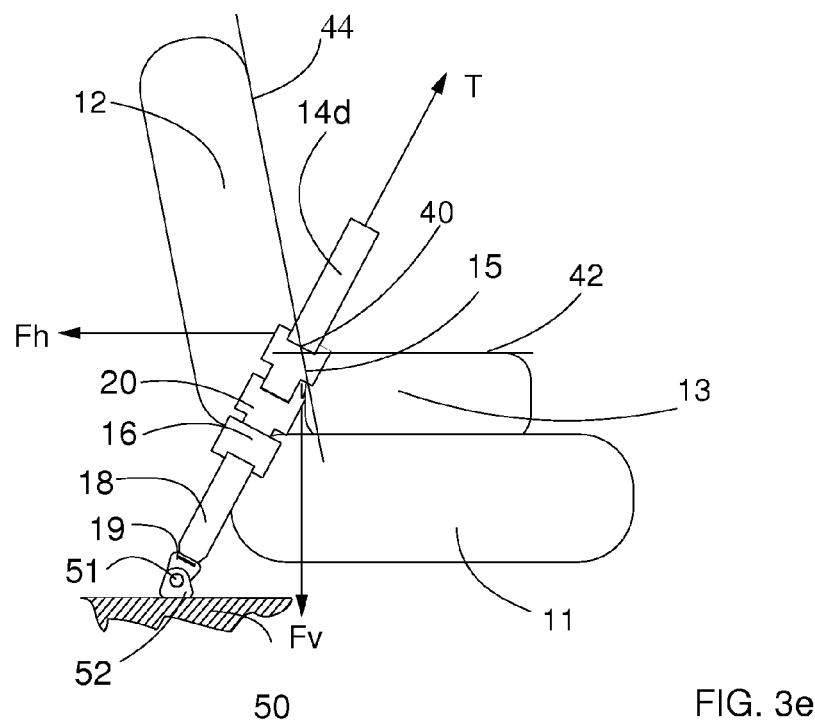
FIG. 3e is a schematic illustration of a preferred embodiment of the present invention depicting a side view showing the seat belt's total equivalent force exertion point, when it is on a section line of the seat surface of the booster seat with the surface of the backrest of the vehicle seat upon which the booster seat is placed.

FIG. 3e is a schematic illustration of a preferred embodiment of the present invention depicting a side view, with the geometrical dimensions of seatbelt adaptor 20 ensuring that when seatbelt adaptor 20 is connected between latch plate 15 and buckle 16, forming an integrative system including the vehicle's seatbelt 14, passing through slot 15a (see FIG. 1b) of the latch plate 15 with latch plate 15 connected to seatbelt adaptor 20, which is connected to buckle 16 connected to the short segment of the vehicle's seatbelt 18 (or any other suitable device installed in the vehicle), whose other end includes a connector which is connected, for example by means of a screw 51 to an anchoring point 52, which is connected directly to the vehicle's frame 50, and force T is exerted on the vehicle's seatbelt upper segment 14d in the suitable direction; the seat belt's total equivalent force exertion point 40 is on the section line of the seat surface 42 of the booster seat 13 with surface 44 of the backrest 12 of the vehicle seat 11 on which the booster seat is placed.

This ensures that the forces exerted on a child seated in the booster seat, of any physical dimensions, no matter how small, by the seatbelt 14 will be in such directions that the child will be adducted downwards towards the booster seat 13 and backwards towards the backrest 12 of the vehicle seat 11.

Figure 3F:
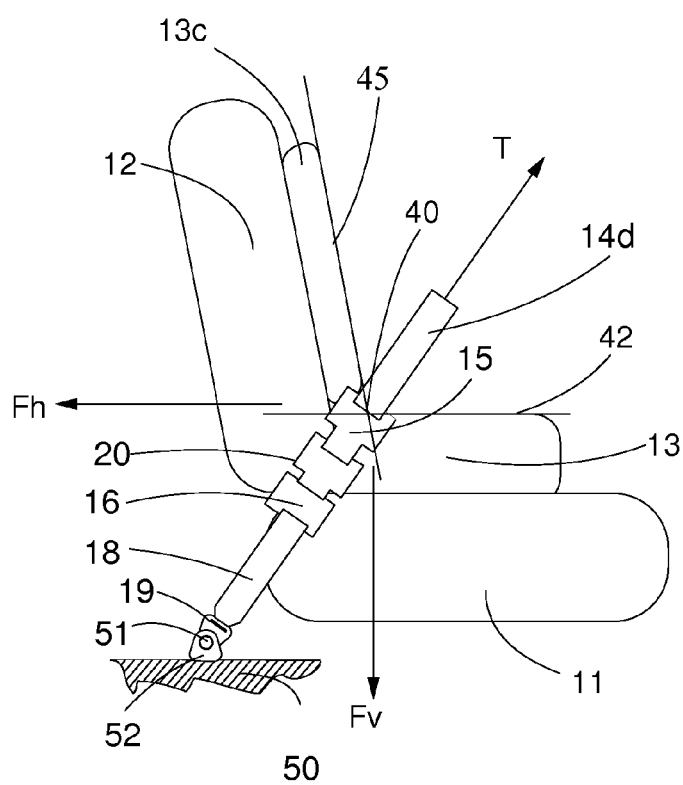
FIG. 3f is a schematic illustration of a preferred embodiment of the present invention depicting a side view showing the seat belt's total equivalent force exertion point, when it is on a section line of the seat surface of the booster sear with the surface of the backrest of the booster seat.

FIG. 3f is a schematic illustration of a preferred embodiment of the present invention depicting a side view. The illustration and accompanying description are identical to those of the previous illustration, other than the fact that the geometrical dimensions of seatbelt adaptor 20 have been adapted for use with a booster seat which has a backrest 13c on whose surface 45 the seated child can rest his back.

The geometrical dimensions of seatbelt adaptor 20 in this case ensure that the seat belt's total equivalent force exertion point 40 will be on the section line of the seat surface 42 of the booster seat 13 with the surface 45 of the booster seat 13 backrest 13c.

Figure 3G:
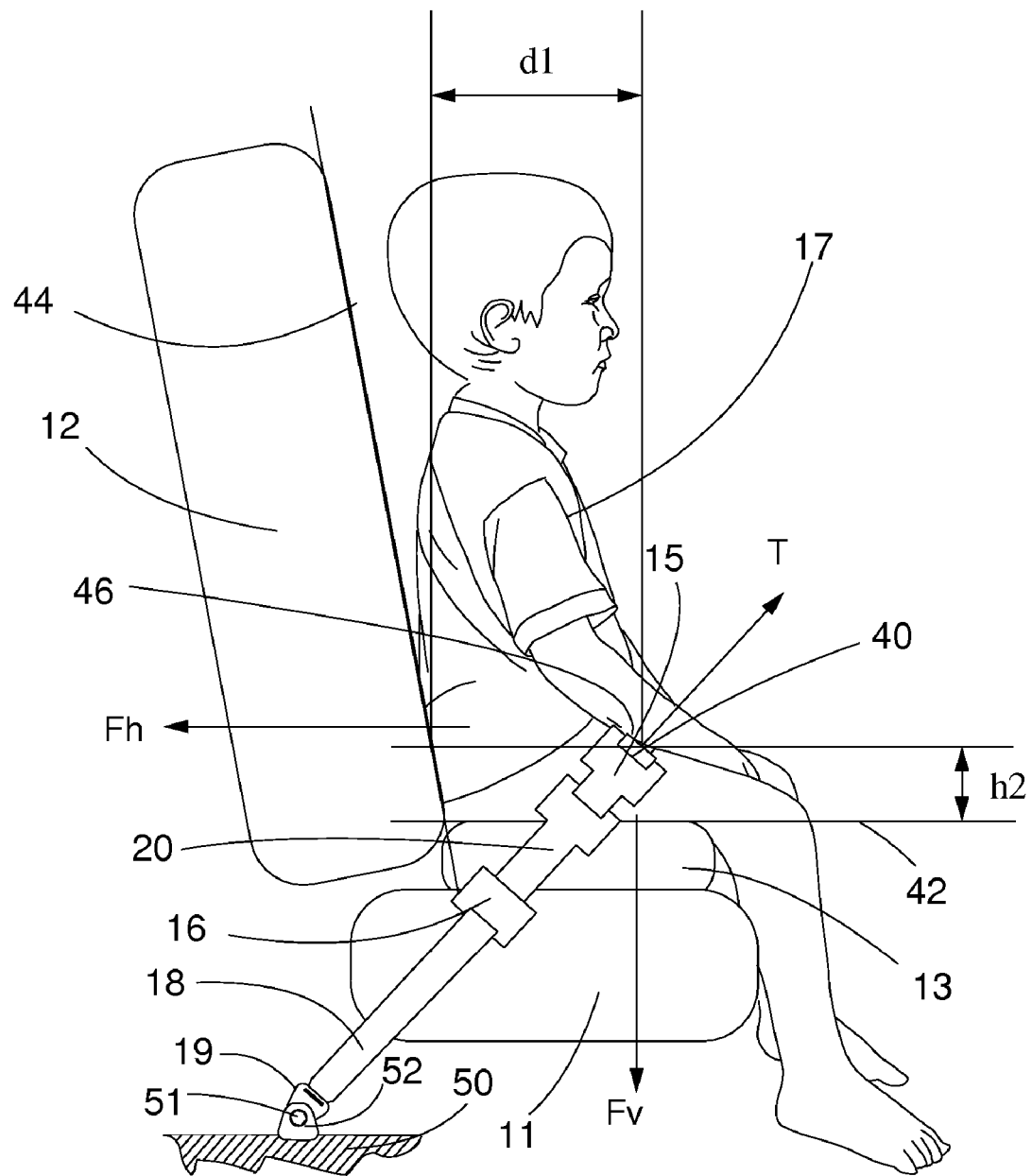
FIG. 3g is a schematic illustration of a preferred embodiment of the present invention depicting a side view showing the seat belt's total equivalent force exertion point, when it is at the intersection point of the upper part of the thigh of a child seated in the booster seat with said child's waist.

FIG. 3g is a schematic illustration of a preferred embodiment of the present invention depicting a side view showing the seat belt's total equivalent force exertion point 40, when it is near the intersection point of the upper part of the thigh of the child seated in the booster seat 13 with said child's waist 46.

A more optimal utilization of the present invention, with respect to FIGS. 3e and 3f, can be achieved when the geometrical dimensions of seatbelt adaptor 20 enable extension of the integrated system as previously described so that point 40 is more distant from the vehicle back seat 11 and backrest 12 so that connection and disconnection of latch plate 15 to seatbelt adaptor 20 is more convenient and safe.

The maximum length allowed in this case is such that the forces exerted on the child in case of emergency braking are downwards and backwards with regard to the vehicle, and this length is achieved when point 40 is approximately at the point of contact between the upper part of the child's thighs and the front part of his waist, shown in the side view as point 46.

The optional length addition, without exceeding the limitation defined above, with regard to the lengths shown in FIGS. 3e and 3f depends on the relevant dimensions of the child 17 seated strapped into the booster seat 13. One option of setting this length is by selecting a seatbelt adaptor 20 personally adapted to a known specific child 17 seated in a known specific booster seat 11 in a known specific vehicle, similar to the manner of selection of standard personal safety accessories.

A good method of selection is checking the selected seatbelt adaptor 20 by connecting it to the vehicle's restraining system, buckling the child into the booster seat, tugging at the seatbelt's upper segment 14d, and verifying that the seatbelt's lap segment 14b exerts forces in the necessary directions on the child 17.

Suitable instructions for proper selection of a seatbelt adaptor 20 can be published much in the same way that instructions for use of child safety seats are published by seat manufacturers and vehicle manufacturers.

Figure 3H:
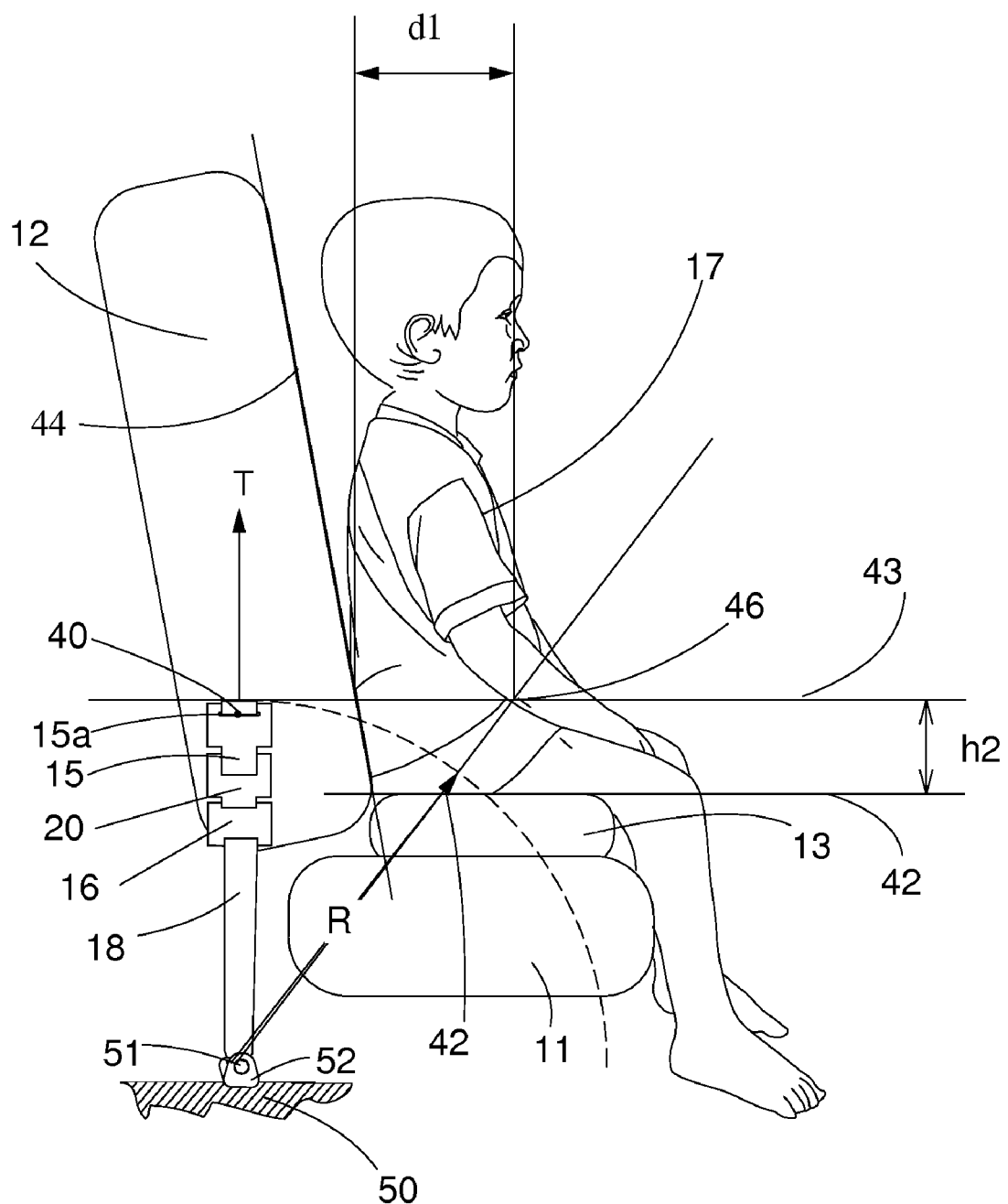
FIG. 3h is a schematic illustration of a preferred embodiment of the present invention depicting a side view showing the seat belt's total equivalent force exertion point, when it is level with a plane parallel to the upper part of the thigh of a child seated in the booster seat, with the force on the latch plate being exerted upwards relative to the vehicle.

FIG. 3h is a schematic illustration of a preferred embodiment of the present invention depicting a side view showing the seat belt's total equivalent force exertion point 40 when it is level with a plane 43, parallel to the upper part of the thigh of the child 17 seated in the booster seat 13, with force T being exerted upwards relative to the vehicle, on latch plate 15, which is connected to seatbelt adaptor 20, connected to buckle 16, connected to the short segment of the vehicle's seatbelt 18 (or any other alternative apparatus installed in the vehicle), whose other end includes a connector 19 (see FIG. 3g), which is connected to the anchoring point 52 connected directly to the vehicle's frame 50.

A seatbelt adaptor 20 can be selected to have a length suitable and safe for any child seated in a booster seat, according to safety regulations. Safety instructions for strapping children in booster safety seats in vehicles are published in safety regulations and in publications and recommendations of booster seat manufacturers, vehicle manufacturers, and safety organizations. Perusing these instructions and regulations can teaches that different booster seats have different minimum child weight values for use with the seat, the lowest value at 15 kg, which is the approximate average weight of a three year old child.

Obviously, not every three year old child has the same physical dimension, and there is a distribution of dimensions. (One should also take into account that when force is exerted on a child's body by a seatbelt, there is a certain degree of squashing of the child's soft tissue, however seeing as this tissue is in proximity to the pelvic bone, the squashing is negligible for our concerns.) Therefore, the selection must be according to the dimensions of a child of a minimal weight of 15 kg, or a minimal age of three years, who has reasonable minimal dimensions. Dimension h2, being the vertical gap between surface 42 and surface 43, is the smallest likely size for a three year old child and in any case for any child weighing at least 15 kg, ensures that for every possible disposition of the anchoring point 52, when the child is being strapped into the booster seat, point 40 will be lower than plane 43, including a safety margin, as shown in the illustration by the arrow of radius R. In this case, slot 15a of the latch plate 15, including point 40 is horizontal and is all practically level with plane 43.

Anthropometric research and measurements that we have conducted indicate that the dimensions of the smallest child which can be safely seated in a booster safety seat include a thigh depth of 6 cm when the child is seated, which is essentially the dimension marked as h2 in the illustration, and an abdominal depth of 12 cm, which is marked as d1 in the illustration.

Figure 4A:
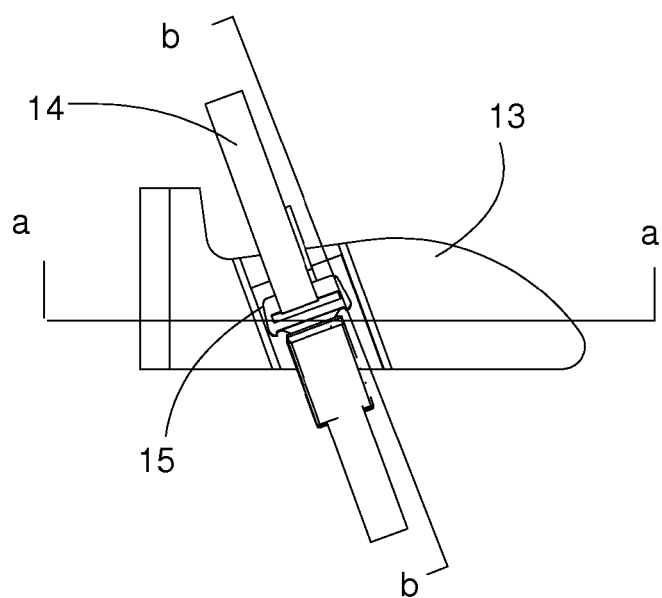
FIG. 4a is a schematic illustration of a preferred embodiment of the present invention depicting a side view of a part of the child restraint system and a booster safety seat.

FIG. 4a is a schematic illustration of a preferred embodiment of the present invention depicting a side view of a part of the child restraint system and a booster safety seat whose structure conforms to the restraint system. The illustration shows that the restraint system is in the groove located in the side of the booster safety seat 13. The material from which the structure of the safety seat is assembled in the area of the grove can be a material, such as rubber, that is suitable for contact with rigid parts, or any other material known to an expert in the field. This material can be suitable for restraining friction forces and blows inflicted by the rigid parts of the restraint system on the booster safety seat 13. The groove can be in one suitable side of the booster safety seat 13; there can also be two grooves, one in each suitable side. The material that is suitable for restraining can also be on the possible contact areas of the rigid parts of the restraint system.

Figure 4B:
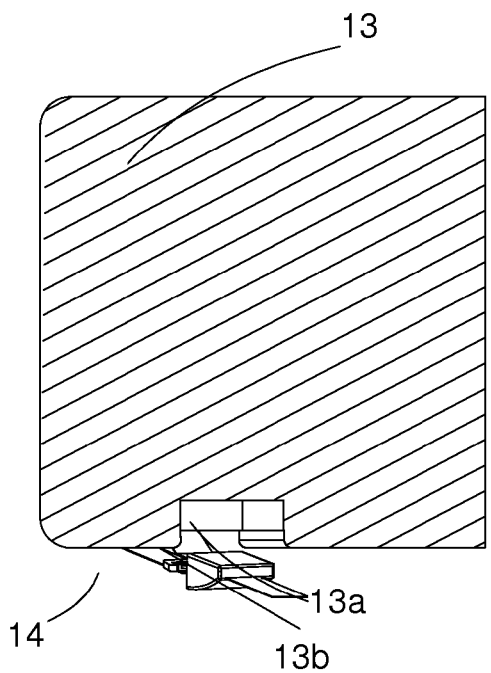

FIG. 4b is a schematic illustration of section a-a of FIG. 4a. The section illustration shows that the structure of the booster safety seat 13 has a groove with two levels of depth, deep level 13a and less deep level 13b. The restraint system touches the booster safety seat 13 only in the area of level 13b.

Figure 4C:
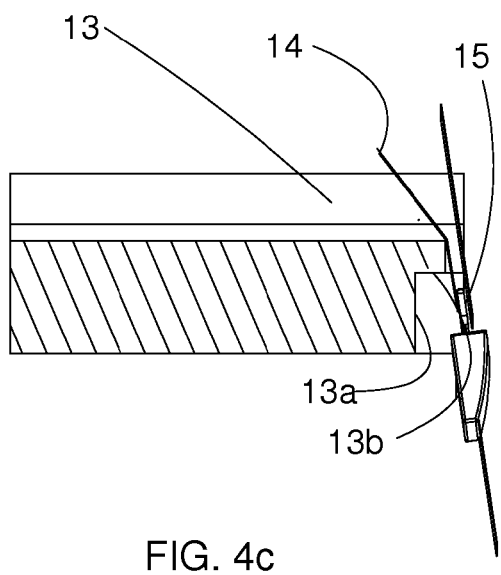

FIG. 4c is a schematic illustration of section b-b of FIG. 4a. The section illustration shows that the structure of booster safety seat 13 includes a groove with two levels of depth, deep level 13a and less deep level 13b. The restraint system touches the booster safety system 13 only in the area of level 13b. This structure of the booster safety seat 13 causes only a portion of seatbelt 14 to touch booster safety seat 13 when there is tension force in the restraint system, while the rigid parts, such as latch plate 15, do not touch the booster safety seat 13 and do not exert forces on it.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A system for improving the buckling and unbuckling of a child in a child booster safety seat in a motor vehicle, wherein the motor vehicle has a conventional seatbelt restraint system for use of an adult, wherein the conventional seatbelt restraint system has a safety seatbelt, a latch plate and a buckle, wherein the latch plate of the conventional seatbelt restraint system has a slot through which the safety seatbelt of the conventional seatbelt restraint system passes, and wherein the latch plate of the conventional seatbelt restraint system operatively divides the safety seatbelt into two segments, a lap segment and a chest and shoulder segment, and wherein the buckle of the conventional seatbelt restraint system is located close to the motor vehicle's back seat near the backrest of the back seat, and wherein the latch plate of the conventional seatbelt restraint system can be comfortably connected and released, enabling safe restraining of a child in normal operation and in case of emergency, and enabling easy and safe release of the child from the child restraint system, the system comprising:

(a) a child booster safety seat, having an upper surface for the child to sit upon; and
(b) a seatbelt adaptor, the seatbelt adaptor including:
(i) a rigid central lengthening device;
(ii) an adaptor latch plate for attachment and detachment to said buckle of said conventional seatbelt restraint system, said adaptor latch plate disposed at a first end of said central lengthening device; and
(iii) an adaptor buckle for attachment and detachment to said latch plate of said conventional seatbelt restraint system, said adaptor buckle disposed at a second end of said central lengthening device, wherein said adaptor latch plate is configured for connecting to said buckle of said conventional seatbelt restraint system, and wherein said adaptor buckle is configured for connecting to said latch plate of said conventional seatbelt restraint system, that secures a child into said child booster safety seat within said motor vehicle, and wherein the length of said seatbelt adaptor is so dimensioned as to be suited to improve the latching of the buckle of said motor vehicle's conventional seatbelt restraint system, and wherein said adaptor buckle includes no permanent bolt coupling, wherein geometrical characteristics of said child booster safety seat, said seatbelt adaptor, said latch plate of said conventional seatbelt restraint system, and said buckle of said conventional seatbelt restraint system are such that the maximum vertical displacement of said slot of said latch plate of said conventional seatbelt restraint system from an anchoring point of said buckle of said conventional restraint system to said vehicle frame when said latch plate of said conventional seatbelt restraint system is connected to said adaptor buckle, and said adaptor latch plate is connected to said buckle of said conventional seatbelt restraint system, is approximately six to eight centimeters above said upper surface of said child booster safety seat, said characteristics thereby enabling fast and easy release of said child from said child restraint system, and further enabling that in case of emergency braking, said lap segment of said seatbelt will exert an adducting force having a downward component and a backward component, relative to said vehicle, so as to adduct said child's lap downwards and backwards with regard to said child booster safety seat, and said chest and shoulder segment of said seatbelt will exert a backwards adducting force on a said child's chest.

2. The article of manufacture of claim 1 wherein said article of manufacture further comprises:

(c) a seat cushion, having an upper surface, disposed at said child booster safety seat, wherein when a force is activated on said latch plate of said conventional seatbelt restraint system upwards with regard to said motor vehicle, the location of said slot of said latch plate of said conventional seatbelt restraint system is substantially at a height of at least six centimeters and at most eight centimeters above the height of said upper surface of said cushion.

3. The article of manufacture of claim 1 wherein said child booster safety seat is at least in part of a material suitable for restraining vibrations and blows that could be exerted on it when in contact with said seatbelt adaptor.

4. A system for improving the buckling and unbuckling of a child in a child booster safety seat in a motor vehicle, wherein the motor vehicle has a conventional seatbelt restraint system for use of an adult, wherein the conventional seatbelt restraint system has a safety seatbelt, a latch plate and a buckle, wherein the latch plate of the conventional seatbelt restraint system has a slot through which the safety seatbelt of the conventional seatbelt restraint system passes, and wherein the latch plate of the conventional seatbelt restraint system operatively divides the safety seatbelt into two segments, a lap segment and a chest and shoulder segment, and wherein the buckle of the conventional seatbelt restraint system is located close to the motor vehicle's back seat near the backrest of the back seat, and wherein the latch plate of the conventional seatbelt restraint system can be comfortably connected and released, enabling safe restraining of a child in normal operation and in case of emergency, and enabling easy and safe release of the child from the child restraint system, the system comprising:

(a) a child booster safety seat, having an upper surface for the child to sit upon; and (b) a seatbelt adaptor, the seatbelt adaptor including:
  (i) a rigid central lengthening device;
  (ii) an adaptor latch plate for attachment and detachment to said buckle of said conventional seatbelt restraint system, said adaptor latch plate disposed at a first end of said central lengthening device; and
  (iii) an adaptor buckle for attachment and detachment to said latch plate of said conventional seatbelt restraint system, said adaptor buckle disposed at a second end of said central lengthening device, wherein said adaptor latch plate is configured for connecting to said buckle of said conventional seatbelt restraint system, and wherein said adaptor buckle is configured for connecting to said latch plate of said conventional seatbelt restraint system, that secures a child into said child booster safety seat within said motor vehicle, and wherein the length of said seatbelt adaptor is so dimensioned as to be suited to improve the latching of the buckle of said motor vehicle's conventional seatbelt restraint system, and wherein said adaptor buckle includes no permanent bolt coupling, wherein geometrical characteristics of said child booster safety seat, said seatbelt adaptor, said latch plate of said conventional seatbelt restraint system, and said buckle of said conventional seatbelt restraint system are such that the maximum vertical displacement of said slot of said latch plate of said conventional seatbelt restraint system from an anchoring point of said buckle of said conventional restraint system to said vehicle frame when said latch plate of said conventional seatbelt restraint system is connected to said adaptor buckle, and said adaptor latch plate is connected to said buckle of said conventional seatbelt restraint system, is substantially at a height of at least eight centimeters and at most ten centimeters above the height of said upper surface of said child booster safety seat, said characteristics thereby enabling fast and easy release of said child from said child restraint system, and further enabling that in case of emergency braking, said lap segment of said seatbelt will exert an adducting force having a downward component and a backward component, relative to said vehicle, so as to adduct said child's lap downwards and backwards with regard to said child booster safety seat, and said chest and shoulder segment of said seatbelt will exert a backwards adducting force on a said child's chest.

5. The system of claim 4 wherein said system further comprises:

(c) a seat cushion, having an upper surface, disposed at said child booster safety seat, wherein when a force is activated on said latch plate of said conventional seatbelt restraint system upwards with regard to said motor vehicle, the location of said slot of said latch plate of said conventional seatbelt restraint system is substantially at a height of at least eight centimeters and at most ten centimeters above the height of said upper surface of said cushion.

6. A system for improving the buckling and unbuckling of a child in a child booster safety seat in a motor vehicle, wherein the motor vehicle has a conventional seatbelt restraint system for use of an adult, wherein the conventional seatbelt restraint system has a safety seatbelt, a latch plate and a buckle, wherein the latch plate of the conventional seatbelt restraint system has a slot through which the safety seatbelt of the conventional seatbelt restraint system passes, and wherein the latch plate of the conventional seatbelt restraint system operatively divides the safety seatbelt into two segments, a lap segment and a chest and shoulder segment, and wherein the buckle of the conventional seatbelt restraint system is located close to the motor vehicle's back seat near the backrest of the back seat, and wherein the latch plate of the conventional seatbelt restraint system can be comfortably connected and released, enabling safe restraining of a child in normal operation and in case of emergency, and enabling easy and safe release of the child from the child restraint system, the system comprising:

(a) a child booster safety seat, having an upper surface for the child to sit upon; and (b) a seatbelt adaptor, the seatbelt adaptor including:
  (i) a rigid central lengthening device;
  (ii) an adaptor latch plate for attachment and detachment to said buckle of said conventional seatbelt restraint system, said adaptor latch plate disposed at a first end of said central lengthening device; and
  (iii) an adaptor buckle for attachment and detachment to said latch plate of said conventional seatbelt restraint system, said adaptor buckle disposed at a second end of said central lengthening device, wherein said adaptor latch plate is configured for connecting to said buckle of said conventional seatbelt restraint system, and wherein said adaptor buckle is configured for connecting to said latch plate of said conventional seatbelt restraint system, that secures a child into said child booster safety seat within said motor vehicle, and wherein the length of said seatbelt adaptor is so dimensioned as to be suited to improve the latching of the buckle of said motor vehicle's conventional seatbelt restraint system, and wherein said adaptor buckle includes no permanent bolt coupling, wherein geometrical characteristics of said child booster safety seat, said seatbelt adaptor, said latch plate of said conventional seatbelt restraint system, and said buckle of said conventional seatbelt restraint system are such that the maximum vertical displacement of said slot of said latch plate of said conventional seatbelt restraint system from an anchoring point of said buckle of said conventional restraint system to said vehicle frame when said latch plate of said conventional seatbelt restraint system is connected to said adaptor buckle, and said adaptor latch plate is connected to said buckle of said conventional seatbelt restraint system, is substantially at a height of at least ten centimeters and at most twelve centimeters above the height of said upper surface of said child booster safety seat, said characteristics thereby enabling fast and easy release of said child from said child restraint system, and further enabling that in case of emergency braking, said lap segment of said seatbelt will exert an adducting force having a downward component and a backward component, relative to said vehicle, so as to adduct said child's lap downwards and backwards with regard to said child booster safety seat, and said chest and shoulder segment of said seatbelt will exert a backwards adducting force on a said child's chest.

7. The system of claim 6 wherein said system further comprises:
(c) a seat cushion, having an upper surface, disposed at said child booster safety seat, wherein when a force is activated on said latch plate of said conventional seatbelt restraint system upwards with regard to said motor vehicle, the location of said slot of said latch plate of said conventional seatbelt restraint system is substantially at a height of at least ten centimeters and at most twelve centimeters above the height of said upper surface of said cushion.

8. A system for improving the buckling and unbuckling of a child in a child booster safety seat in a motor vehicle, wherein the motor vehicle has a conventional seatbelt restraint system for use of an adult, wherein the conventional seatbelt restraint system has a safety seatbelt, a latch plate and a buckle, wherein the latch plate of the conventional seatbelt restraint system has a slot through which the safety seatbelt of the conventional seatbelt restraint system passes, and wherein the latch plate of the conventional seatbelt restraint system operatively divides the safety seatbelt into two segments, a lap segment and a chest and shoulder segment, and wherein the buckle of the conventional seatbelt restraint system is located close to the motor vehicle's back seat near the backrest of the back seat, and wherein the latch plate of the conventional seatbelt restraint system can be comfortably connected and released, enabling safe restraining of a child in normal operation and in case of emergency, and enabling easy and safe release of the child from the child restraint system, the system comprising:
(a) a child booster safety seat, having an upper surface for the child to sit upon; and
(b) a seatbelt adaptor, the seatbelt adaptor including:
(i) a rigid central lengthening device;
(ii) an adaptor latch plate for attachment and detachment to said buckle of said conventional seatbelt restraint system, said adaptor latch plate disposed at a first end of said central lengthening device; and
(iii) an adaptor buckle for attachment and detachment to said latch plate of said conventional seatbelt restraint system, said adaptor buckle disposed at a second end of said central lengthening device, wherein said adaptor latch plate is configured for connecting to said buckle of said conventional seatbelt restraint system, and wherein said adaptor buckle is configured for connecting to said latch plate of said conventional seatbelt restraint system, that secures a child into said child booster safety seat within said motor vehicle, and wherein said adaptor buckle includes no permanent bolt coupling, wherein the geometric shape of said child booster safety seat conforms to the geometric shape of said seatbelt adaptor.

9. A system for improving the buckling and unbuckling of a child in a child booster safety seat in a motor vehicle, wherein the motor vehicle has a conventional seatbelt restraint system for use of an adult, wherein the conventional seatbelt restraint system has a safety seatbelt, a latch plate and a buckle, wherein the latch plate of the conventional seatbelt restraint system has a slot through which the safety seatbelt of the conventional seatbelt restraint system passes, and wherein the latch plate of the conventional seatbelt restraint system operatively divides the safety seatbelt into two segments, a lap segment and a chest and shoulder segment, and wherein the buckle of the conventional seatbelt restraint system is located close to the motor vehicle's back seat near the backrest of the back seat, and wherein the latch plate of the conventional seatbelt restraint system can be comfortably connected and released, enabling safe restraining of a child in normal operation and in case of emergency, and enabling easy and safe release of the child from the child restraint system, the system comprising:
(a) a child booster safety seat, having an upper surface for the child to sit upon; and
(b) a seatbelt adaptor, the seatbelt adaptor including:
(i) a rigid central lengthening device;
(ii) a latch plate for attachment and detachment to said buckle of said conventional seatbelt restraint system, said latch plate disposed at a first end of said central lengthening device; and
(iii) a buckle for attachment and detachment to said latch plate of said conventional seatbelt restraint system, said buckle disposed at a second end of said central lengthening device, wherein said latch plate of said seatbelt adaptor is configured for connecting to said buckle of said conventional seatbelt restraint system, and wherein said buckle of said seatbelt adaptor is configured for connecting to said latch plate of said conventional seatbelt restraint system, that secures a child into said child booster safety seat within said motor vehicle, and wherein the length of said seatbelt adaptor is so dimensioned as to be suited to improve the latching of the buckles of said motor vehicle's conventional seatbelt restraint system, and wherein said buckle of said seatbelt adaptor includes no permanent bolt coupling, wherein said child booster safety seat, having a groove with two levels of depth, deep level and less deep level conforms to the geometric shape of said seatbelt adaptor.

10. A system for improving the buckling and unbuckling of a child in a child booster safety seat in a motor vehicle, wherein the motor vehicle has a conventional seatbelt restraint system for use of an adult, wherein the conventional seatbelt restraint system has a safety seatbelt, a latch plate and a buckle, wherein the latch plate of the conventional seatbelt restraint system has a slot through which the safety seatbelt of the conventional seatbelt restraint system passes, and wherein the latch plate of the conventional seatbelt restraint system operatively divides the safety seatbelt into two segments, a lap segment and a chest and shoulder segment, and wherein the buckle of the conventional seatbelt restraint system is located close to the motor vehicle's back seat near the backrest of the back seat, and wherein the latch plate of the conventional seatbelt restraint system can be comfortably connected and released, enabling safe restraining of a child in normal operation and in case of emergency, and enabling easy and safe release of the child from the child restraint system, the system comprising:
(a) a child booster safety seat, having an upper surface for the child to sit upon; and
(b) a plurality of seatbelt adaptors, each said seatbelt adaptor including:
(i) a rigid central lengthening device;
(ii) an adaptor latch plate for attachment and detachment to said buckle of said conventional seatbelt restraint system, said adaptor latch plate disposed at a first end of said central lengthening device; and
(iii) an adaptor buckle for attachment and detachment to said latch plate of said conventional seatbelt restraint system, said adaptor buckle disposed at a second end of said central lengthening device, wherein said adaptor latch plate is configured for connecting to said buckle of said conventional seatbelt restraint system, and wherein said adaptor buckle is configured for connecting to said latch plate of said conventional seatbelt restraint system, that secures a child into said child booster safety seat within said motor vehicle, and wherein the length of said seatbelt adaptor is so dimensioned as to be suited to improve the latching of the buckle of said motor vehicle's conventional seatbelt restraint system, and wherein said adaptor buckle includes no permanent bolt coupling, wherein geometrical characteristics of said child booster safety seat, each of said seatbelt adaptors, said latch plate of said conventional seatbelt restraint system, and said buckle of said conventional seatbelt restraint system are such that the maximum vertical displacement of said slot of said latch plate of said conventional seatbelt restraint system from an anchoring point of said buckle of said conventional restraint system to said vehicle frame when said latch plate of said conventional seatbelt restraint system is connected to said adaptor buckle, and said adaptor latch plate is connected to said buckle of said conventional seatbelt restraint system is different for each of said seatbelt adaptors.

11. The system of claim 10, wherein the plurality of seatbelt adaptors comprises first and second adaptors, wherein when said first adaptor is connected to said buckle and latch plate of the conventional restraint system, said maximum vertical displacement is between six and eight centimeters, and wherein when said second adaptor is connected to said buckle and latch plate of the conventional restraint system, the maximum vertical displacement is between eight and ten centimeters.

12. The system of claim 10, wherein the plurality of seatbelt adaptors further comprises a third adaptor, wherein when the third adaptor is connected to said buckle and latch plate of the conventional restraint system, the maximum vertical displacement is between ten and twelve centimeters.

* * * * *

UNITED STATES PATENT AND TRADEMARK OFFICE
CERTIFICATE OF CORRECTION

| | |
|---|---|
| PATENT NO. | : 7,533,901 B2 |
| APPLICATION NO. | : 11/560864 |
| DATED | : May 19, 2009 |
| INVENTOR(S) | : Yair David |

It is certified that error appears in the above-identified patent and that said Letters Patent is hereby corrected as shown below:

In column 14, line 43, please replace "article of manufacture" with --system--.

In column 14, line 54, please replace "article of manufacture" with --system--.

Signed and Sealed this
Third Day of May, 2011

David J. Kappos
*Director of the United States Patent and Trademark Office*